(12) United States Patent
Sullivan et al.

(10) Patent No.: US 7,284,025 B2
(45) Date of Patent: Oct. 16, 2007

(54) DDS PULSE GENERATOR ARCHITECTURE

(75) Inventors: Steven K. Sullivan, Beaverton, OR (US); Raymond L. Veith, Portland, OR (US); Iwao Akiyama, Shizuoka (JP); Yasumasa Fujisawa, Kamakura (JP)

(73) Assignee: Tektronix, Inc., Beaverton, OR (US)

( * ) Notice: Subject to any disclaimer, the term of this patent is extended or adjusted under 35 U.S.C. 154(b) by 811 days.

(21) Appl. No.: 10/739,591

(22) Filed: Dec. 18, 2003

(65) Prior Publication Data
US 2005/0134330 A1    Jun. 23, 2005

(51) Int. Cl.
*G06F 1/02* (2006.01)
(52) U.S. Cl. ......................... 708/271; 708/272
(58) Field of Classification Search ................ 708/271, 708/272; 327/106
See application file for complete search history.

(56) References Cited

U.S. PATENT DOCUMENTS

| | | | |
|---|---|---|---|
| 5,430,764 A * | 7/1995 | Chren, Jr. | 375/308 |
| 6,066,967 A * | 5/2000 | Cahill et al. | 327/107 |
| 6,249,155 B1 * | 6/2001 | Hartman et al. | 327/106 |
| 6,307,441 B1 * | 10/2001 | Sharpe | 332/100 |

* cited by examiner

*Primary Examiner*—Chuong D Ngo
(74) *Attorney, Agent, or Firm*—William K. Bucher; Francis I. Gray

(57) ABSTRACT

A DDS pulse generator has an accumulator that accumulates a phase increment value to produce phase accumulator values, and has a lookup table that contains a digital representation of a pulse waveform such that a pulse output signal is produced from the lookup table in response to the phase accumulator values. To change a period of the pulse output signal without changing edge positions a programmable modulo value is used. An address mapper is situated between the accumulator and address lines of the lookup table to map the rising and falling edge portions of the phase accumulator values into large regions of the lookup table, while phase accumulator values corresponding to high and low logic levels are mapped into small regions of the lookup table. The resulting pulse output signal has easily independently controlled period and pulse width as well as rising and falling edge speeds. By making better use of the lookup table it is possible to generate very narrow pulses with low repetition rates or pulses in which the rise time and fall time are very different from the period.

11 Claims, 6 Drawing Sheets

DDS PULSE GENERATOR ARCHITECTURE

BACKGROUND OF THE INVENTION

The present invention relates to pulse or function generators, and more particularly to a direct digital synthesis (DDS) pulse generator architecture that makes it easy to independently control the period and pulse width as well as pulse edge rise and fall times.

Referring to FIG. 1, in the most obvious implementation of DDS architecture for pulse generation, changing the period of a pulse also causes the edge positions as well as the rise and fall times to change, whereas it is desirable to vary just the period or just the edge positions. In classical DDS circuits the frequency is set by repeatedly adding one value, which may be thought of as a phase increment, to an accumulator, sometimes referred to as a phase accumulator. The value in the accumulator may be thought of as a phase angle. The accumulator is built using modulo arithmetic so that phases greater than 360 degrees automatically have 360 degrees removed. The accumulator is typically implemented as a fixed length binary counter so that the addition is automatically modulo a power of two. The most significant bits of the accumulator are used to address a lookup table, since generally the accumulator has more bits than a following digital-to-analog converter (DAC). The lookup table contains a desired waveform. When making a pulse, the lookup table is loaded with a digitized version of the pulse to be generated, as shown in FIG. 2. The output of the lookup table is sent to the DAC. Finally the output of the DAC is filtered to remove aliases and is amplified to a desired output level.

The following table illustrates the operation of a conventional DDS when a sine wave is being generated. The modulo is $2^8=256$ and the phase increment is 25.

| STEP | ACCUMULATOR VALUE | LOOKUP OUTPUT |
| --- | --- | --- |
| 0 | 0 | 0 |
| 1 | 25 | 73 |
| 2 | 50 | 120 |
| 3 | 75 | 123 |
| 4 | 100 | 81 |
| 5 | 125 | 9 |
| 6 | 150 | −66 |
| 7 | 175 | −118 |
| 8 | 200 | −126 |
| 9 | 225 | −89 |
| 10 | 250 | −19 |
| 11 | 19 | 57 |
| 12 | 44 | 112 |
| 13 | 69 | 127 |
| 14 | 94 | 94 |
| 15 | 119 | 28 |
| 16 | 144 | −49 |
| 17 | 169 | −109 |
| 18 | 194 | −128 |
| 19 | 219 | −101 |
| 20 | 244 | −38 |
| . | . | . |

The frequency of the pulse signal is a function of the phase increment, the modulo value and the sample rate, i.e., Frequency=1/Period where Period=Sample_Rate*Modulo/increment. In classical DDS circuits the modulo values and sample rate are usually fixed. The frequency is varied by changing the phase increment value. The disadvantage of changing the phase increment is that this also changes the edge positions and edge rise and fall times. In order to change just the period it is necessary to reload the lookup table each time the phase increment is changed. Reloading the lookup table is a slow operation, and it usually requires stopping the signal generator.

What is desired is a pulse or function generator that easily independently controls the period and pulse width of generated pulses as well as the pulse edge rise and fall times.

BRIEF SUMMARY OF THE INVENTION

Accordingly the present invention provides a DDS pulse generator architecture that allows rising and falling edge rates, period time and edge placement to be independently varied without reloading a waveform table. The DDS pulse generator has an accumulator that accumulates a phase increment value to produce phase accumulator values, and has a waveform lookup table that contains a digital representation of a pulse waveform such that a pulse output signal is produced from the lookup table in response to the phase accumulator values. The lookup table has a compressed version of the waveform, only providing multiple values for varying portions while having as little as a single point for constant value portions. To change a period of the pulse output signal without changing edge positions a programmable modulo value is used. An address mapper is situated between the accumulator and address lines of the lookup table to map the rising and falling edge portions of the phase accumulator values into large regions of the lookup table, while phase accumulator values corresponding to high and low logic levels are mapped into small regions of the lookup table. The resulting pulse output signal has easily independently controlled period and pulse width as well as rising and falling edge speeds. By making better use of the lookup table it is possible to generate very narrow pulses with low repetition rates or pulses in which the rise time and fall time are very different from the period.

The objects, advantages and other novel features of the present invention are apparent from the following detailed description when read in conjunction with the appended claims and attached drawing figures.

DETAILED DESCRIPTION OF THE INVENTION

Figure 3:
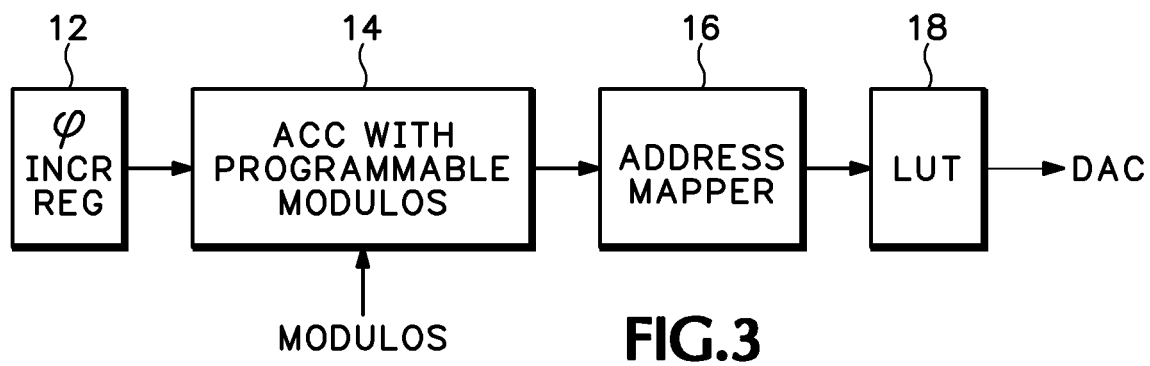
FIG. 3 is a block diagram view of a DDS pulse generator architecture according to the present invention.

Referring now to the circuit shown in FIG. 3, when changing the period of pulses, the phase increment in a phase increment register 12 remains constant and a modulo value is changed at the input to an accumulator 14. This allows the period to be changed without altering the edge positions or the edge rise/fall times. Also an address mapping circuit 16 is used that maps specific ranges of the phase accumulator values into lookup tables, or different regions of a single lookup table (LUT) 18, so that the rising and falling edges are described in detail in the lookup table(s) even when the period is very long compared to the edge rise and fall times. The lookup table 18 may be implemented using a random access memory (RAM).

Figure 1:
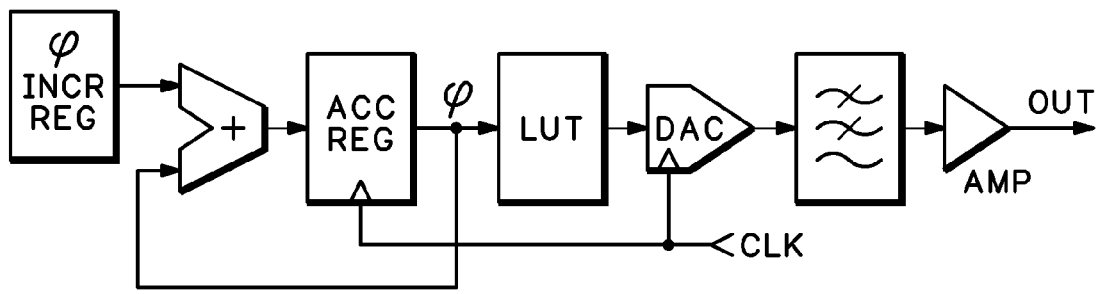
FIG. 1 is a block diagram view of a conventional direct digital synthesis (DDS) architecture.

The phase accumulator shown in FIG. 1 is implemented as a binary counter, but the number of bits is large, such as 40, in order to provide a fine resolution for the frequency of the signal being generated. It is desirable that the computations be completed quickly so that data points are generated rapidly. The speed at which data points are generated determines the maximum frequency components that may reliably be produced, and the production of high frequency components is desirable, i.e., the digital logic needs to be efficient. Although the classical DDS circuit is very efficient, extra circuitry is needed in order to allow modulo arithmetic with a value other than a power of two. Typically this extra circuitry includes a comparator to detect when the phase accumulator has exceeded the modulo value. The output of the comparator controls a subtraction circuit to remove the modulo value from the phase accumulator value.

Figure 5:
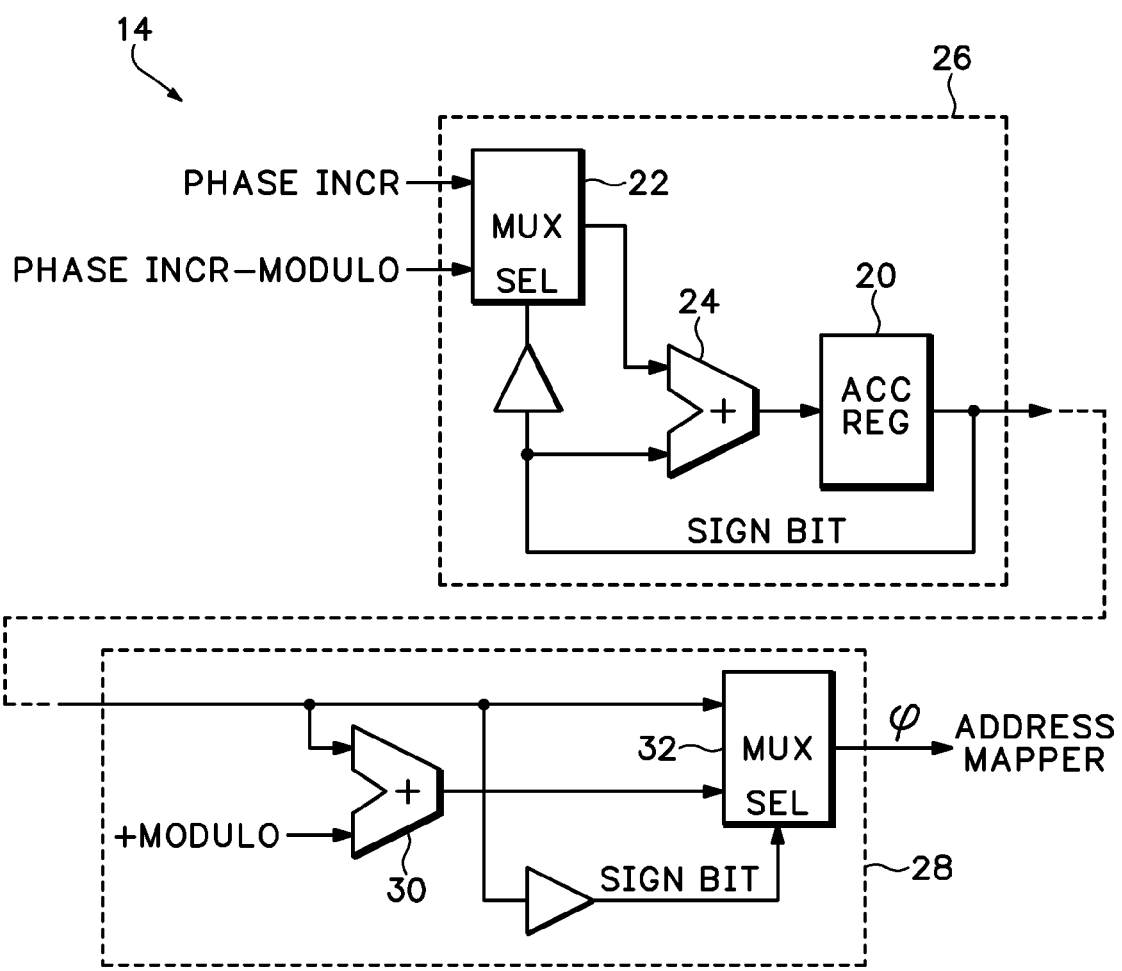
FIG. 5 is a block diagram view of an accumulator for the DDS pulse generator architecture according to the present invention.

The modulo circuit described above produces numbers between zero and one less than the modulo value. But as shown in FIG. 5 for greater efficiency numbers are produced from minus the modulo value up to minus one so that the comparison is done by the binary arithmetic. When the output from a phase accumulator register 20 becomes positive, a multiplexer 22 selects a pre-computed quantity, "phase_increment-modulo", for input to an adder 24 so that the phase increment is added on every cycle and the modulo value is subtracted whenever the accumulator output is positive. The subtraction operation may be delayed by one cycle as long as the phase accumulator portion 26 of the circuit is followed by a circuit 28 that adjusts the values so that they always fall within the desired range. Such a circuit 28 adds or subtracts multiples of the modulo value in another adder 30, as needed, to get the phase accumulator values to be within a desired range. As shown an output multiplexer 32 passes the output from the adder 30 when the phase accumulation value is negative and passes the phase accumulation value itself when it goes positive. When delaying the subtraction operation by one cycle, the subtraction may be combined with the addition of the phase increment. When this is done, the circuit may contain a single adder which either adds the phase increment value or adds the phase increment minus the modulo value. In this case the phase increment minus the modulo value is computed in another circuit. These modifications allow the phase accumulator circuit 14 with arbitrary modulo value to be nearly as fast as a simple phase accumulator that relies on arithmetic overflow to produce a modulo value of a power of two.

Figure 2:
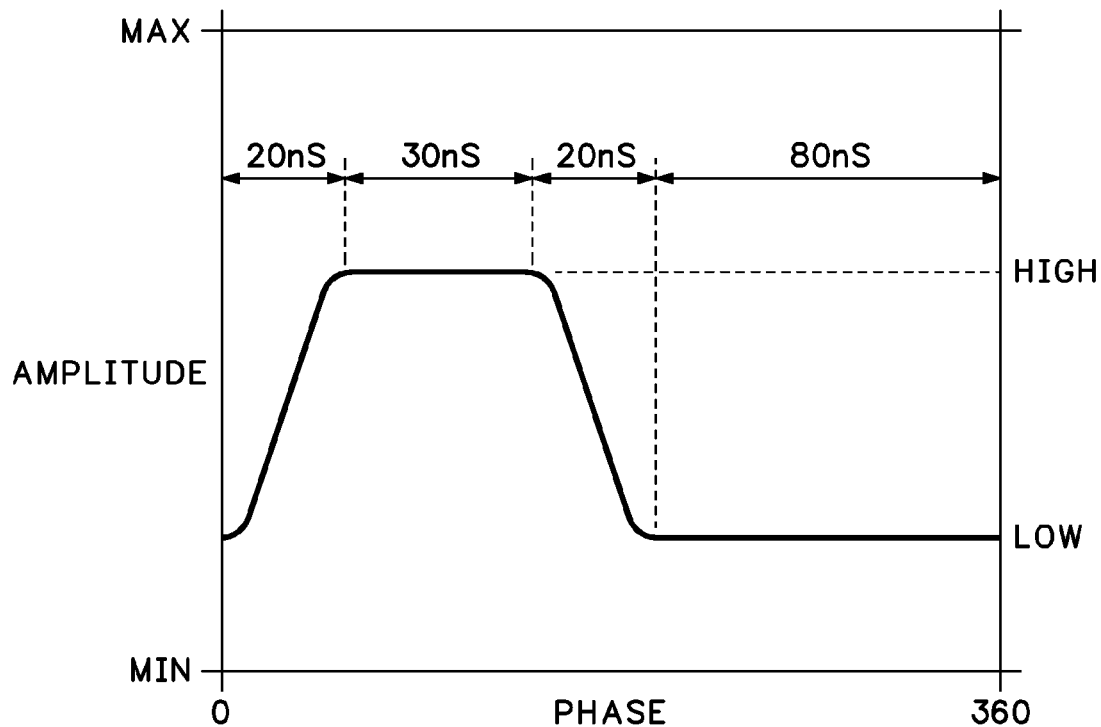
FIG. 2 is a graphic view of the contents of a lookup table for generating pulses using the DDS architecture of FIG. 1.
Figure 4:
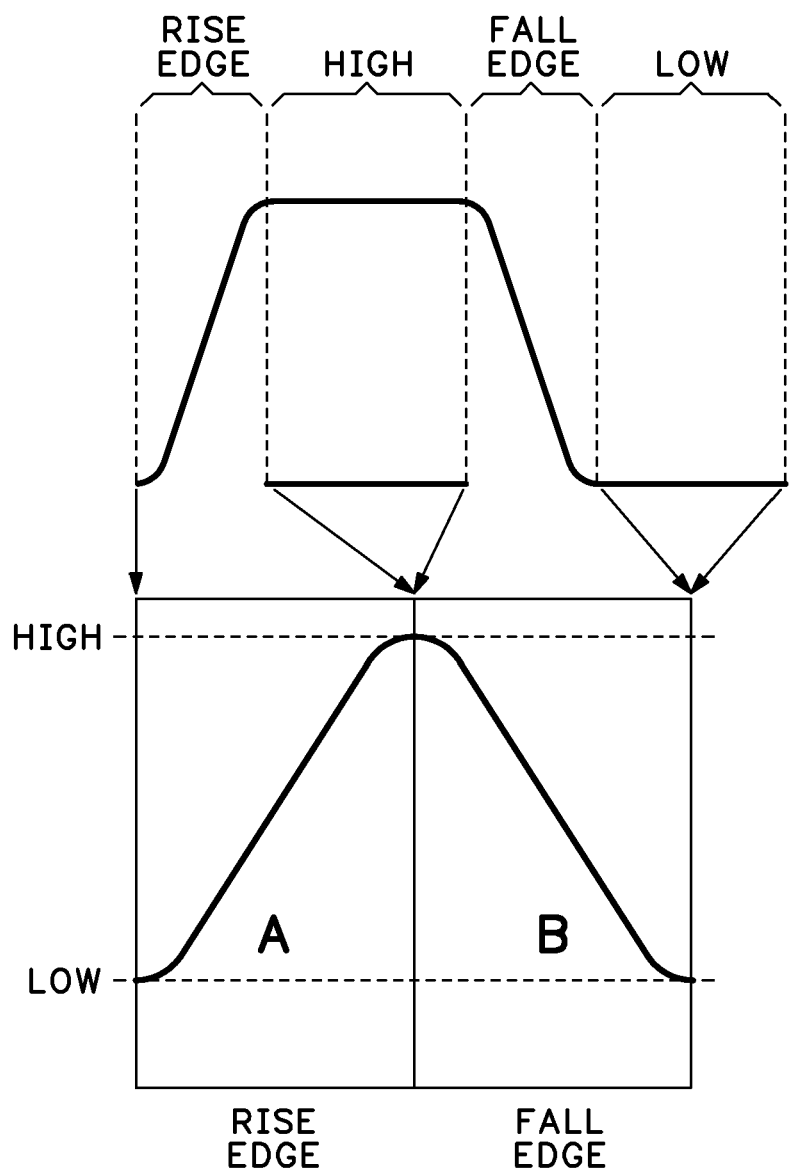
FIG. 4 is a graphic view of the contents of a lookup table for the DDS pulse generator architecture according to the present invention.

If the most significant bits of the accumulator 14 are connected directly to the lookup table address lines, different amounts of the lookup table 18 are used for different modulo values. If a very small modulo value is chosen, only a very small amount of the lookup table 18 is used. Also it may be necessary to change the lookup table 18 in order to move the position of either edge, which in turn may cause the signal generation process to stop during the change so that the signal generator is not able to continuously generate pulses while varying the position of an edge. Also the classical way of addressing the waveform lookup table 18 is inefficient when generating pulses. For instance when making a narrow pulse, very little of the lookup table 18 is used to describe the rising and falling edges of the pulse, as shown in FIG. 2. Large regions of the lookup table 18 are dedicated to representing a low or high level. Because the lookup table 18 is limited in size, it is not advisable to make pulses with a period that is much larger than the rise and fall times. Not enough points in the lookup table 18 are allocated to describing the rising and falling edges since nearly all of the points are used to describe the high or low logic levels. Therefore as shown in FIG. 4 the lookup table of FIG. 2 is compressed so that the rising edge data falls into a first region A, a single point is used to represent the high value, the falling edge data falls into a second region B and a single point is used to represent the low value.

Figure 6:
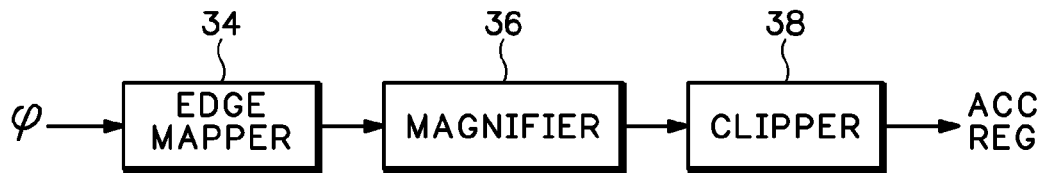
FIG. 6 is a block diagram view of an address mapper for the DDS pulse generator architecture according to the present invention.

The address mapper circuit 16 between the accumulator 14 and address memory lines to the lookup table 18 serves to map the rising and falling edge portions of the accumulator values into large regions A and B of the lookup table. At the same time the accumulator values that correspond to high and low logic levels are mapped into small regions of the lookup table 18, such as a single point as shown in FIG. 4. The address mapper 16 as shown in FIG. 6 has an edge mapper module 34, a magnifier module 36 and a clipper module 38. The address mapper 16 defines the phase accumulator values that are to be mapped into the large regions A and B of the lookup table 18. When the accumulator contains a value within one of these "active" regions, one portion of the address mapper 16 maps the value into a region of the lookup table. There are at least two active regions as shown in FIG. 4—one for the rising edge and one for the falling edge. Accumulator values outside of the active regions are then mapped into much smaller regions of the lookup table—possibly a single entry. The position of a rising edge is changed by changing a value in the register that defines the accumulator values for the rising edge.

Figure 7:
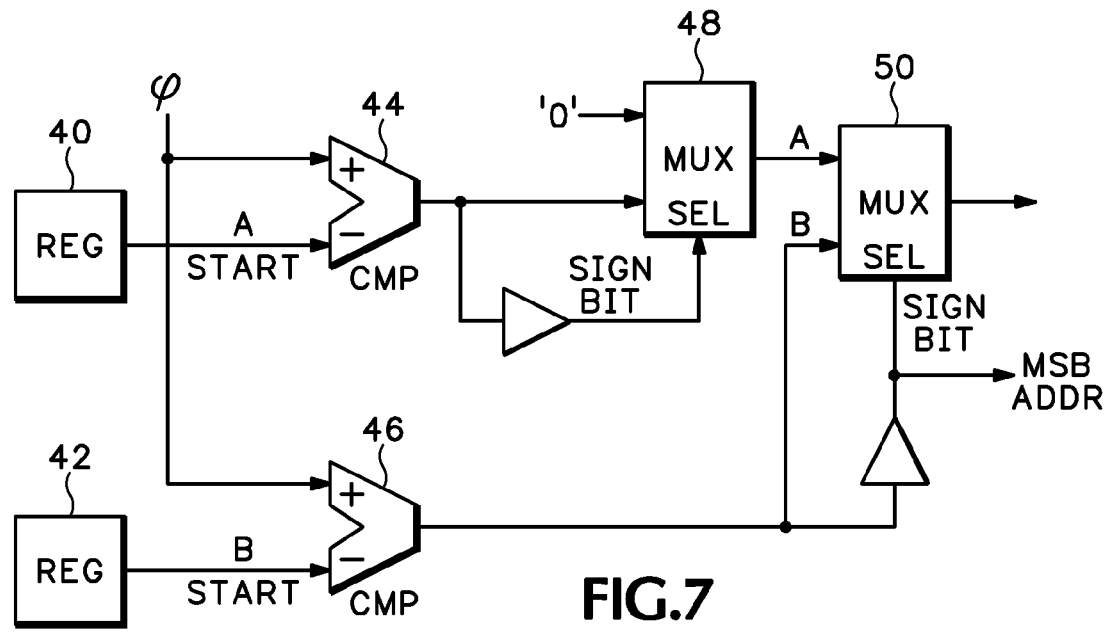
FIG. 7 is a block diagram view of an edge mapper for the address mapper of FIG. 6.

The edge mapper module 34, as shown in FIG. 7, has a pair of registers 40, 42 that contain start values for the respective regions A and B in the lookup table 18. The phase accumulator value $\phi$ from the accumulator 14 is compared with the respective A and B start values in respective comparators 44, 46. The output from the A comparator 44 is input to a multiplexer 48 to which also is input a "0" value. Until the phase accumulator value $\phi$ exceeds the A start value, the multiplexer 48 outputs a zero value to an output multiplexer 50, and subsequently outputs the difference value between the phase accumulator value and the A start value to the output multiplexer. At this time the A input of the output multiplexer 50 is selected providing address values for the A region of the lookup table 18.

Likewise until the phase accumulator value $\phi$ exceeds the B start value, the output multiplexer 50 provides the output from the first multiplexer 48, i.e., the leading edge. When the phase accumulator value $\phi$ exceeds the B start value, then the output from the B comparator 46 is provided by the output multiplexer 50. A MSB ADDR is provided by the B comparator 46 to indicate whether a rising or falling edge is selected. See the examples given below.

The edge mapper module 34 may be designed for more than two edges. Also a different magnifier may be used for each edge to allow the edge rise/fall rates to be independently controlled.

Figure 8A:
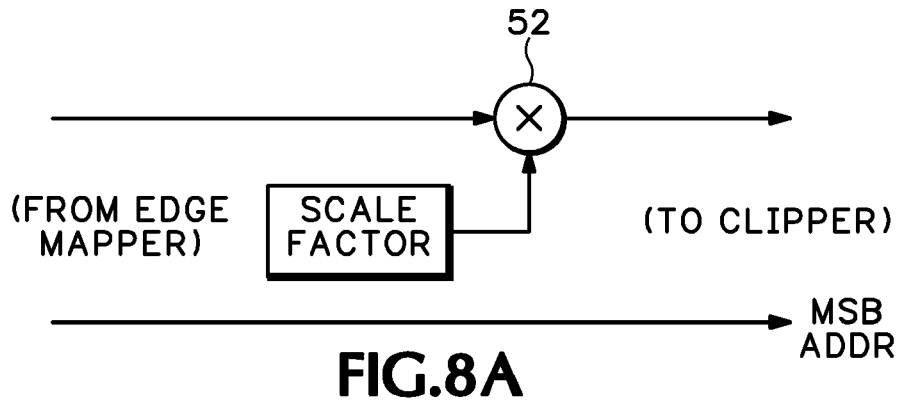
FIGS. 8a and 8b are block diagram views of alternative magnifiers for the address mapper of FIG. 6.
Figure 8B:
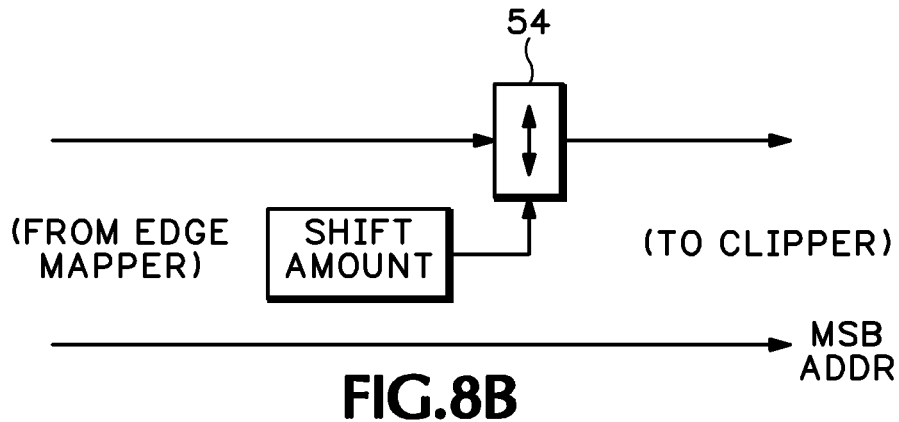
Figure 9:
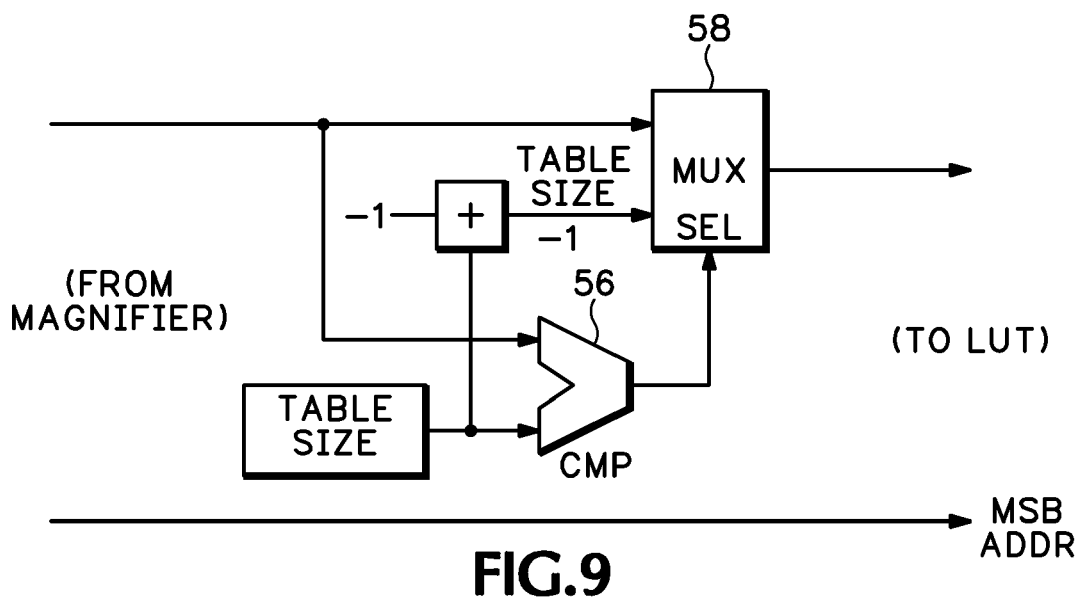
FIG. 9 is a block diagram view of a clipper for the address mapper of FIG. 6.

Referring to FIGS. 8A and 8B, when a multiplier 52 is used as the magnifier 36, the edge rise/fall times may be changed by changing a scaling factor. An alternative is to replace the multiplier 52 by a shifter 54. The shifter 54 is equivalent to the multiplier 52 being limited to multiplying by powers of two. If the shifter 54 is used, the contents of the lookup table 18 may be modified so that the result is equivalent to using the multiplier 52.

The output from the magnifier 36 is input to a comparator 56 and a final multiplexer 58 in the clipper module 38. The comparator 56 also has as an input the size of the lookup table 18. The clipper module 38 assures that all addresses from the address mapping circuit fall within the address range of the lookup table 18. If the address from the magnifier module 36 is greater than or equal to the table size, then an address value equal to the maximum address in the lookup table 18, table_size-1, is selected by the multiplexer 58.

The following table illustrates a simulation of the DDS pulse generator. The first column is the sample number. If the sample rate is 1 ns, then this column is also time in nanoseconds. In this simulation the phase increment is 10, causing the accumulator value (acc) to advance by 10 on every step. The initial period is 15 samples, making the modulo value 150. The simulation starts with zero in the phase accumulator at sample zero.

| Sample | Acc | Fix | -Map- | -Map- | Mag | Clip | DAC |
| --- | --- | --- | --- | --- | --- | --- | --- |
| 0 | 0 | 0 | 0 | 0 | 0 | 0 | 0.00 |
| 1 | −140 | 10 | 0 | 10 | 33 | 33 | 0.33 |
| 2 | −130 | 20 | 0 | 20 | 67 | 67 | 0.67 |
| 3 | −120 | 30 | 0 | 30 | 100 | 100 | 1.00 |
| 4 | −110 | 40 | 0 | 40 | 133 | 100 | 1.00 |
| 5 | −100 | 50 | 1 | 0 | 0 | 0 | 1.00 |
| 6 | −90 | 60 | 1 | 10 | 33 | 33 | 0.67 |
| 7 | −80 | 70 | 1 | 20 | 67 | 67 | 0.33 |
| 8 | −70 | 80 | 1 | 30 | 100 | 100 | 0.00 |
| 9 | −60 | 90 | 1 | 40 | 133 | 100 | 0.00 |
| 10 | −50 | 100 | 1 | 50 | 167 | 100 | 0.00 |
| 11 | −40 | 110 | 1 | 60 | 200 | 100 | 0.00 |
| 12 | −30 | 120 | 1 | 70 | 233 | 100 | 0.00 |
| 13 | −20 | 130 | 1 | 80 | 267 | 100 | 0.00 |
| 14 | −10 | 140 | 1 | 90 | 300 | 100 | 0.00 |
| 15 | 0 | 0 | 0 | 0 | 0 | 0 | 0.00 |
| 16 | −140 | 10 | 0 | 10 | 33 | 33 | 0.33 |
| 17 | −130 | 20 | 0 | 20 | 67 | 67 | 0.67 |
| 18 | −120 | 30 | 0 | 30 | 100 | 100 | 1.00 |
| 19 | −110 | 40 | 0 | 40 | 133 | 100 | 1.00 |
| 20 | −100 | 50 | 1 | 0 | 0 | 0 | 1.00 |
| 21 | −90 | 60 | 1 | 10 | 33 | 33 | 0.67 |
| 22 | −80 | 70 | 1 | 20 | 67 | 67 | 0.33 |
| 23 | −70 | 80 | 1 | 30 | 100 | 100 | 0.00 |
| 24 | −60 | 90 | 1 | 40 | 133 | 100 | 0.00 |
| 25 | −50 | 100 | 1 | 50 | 167 | 100 | 0.00 |

At sample 1 the accumulator is incremented by 10—the phase increment. Since the accumulator output is positive (zero), the modulo value is also subtracted. The output of the phase accumulator register 20 is shown in the column "Acc". The output of the multiplexer 32, where negative numbers are made positive, is shown in the column "Fix". The output of the edge mapper multiplexer 50 and the MSB ADDR are shown under the columns "-Map-". As shown MSB ADDR is zero during the rising edge and one during the falling edge. The output of the magnifier multiplier 52 is shown in the column "Mag". The output of the clipper multiplexer 58 is shown in the column "Clip". Finally the output of the lookup table 18 is shown in the column "DAC". The resulting waveform has three samples each for the rising and falling edges, the position of the rising edge (A_Start) is set to zero and the position of the falling edge (B_Start) is set to 50, or 5 samples.

In the following table the period is changed to 10 samples by changing the modulo value to 100. The edge rise and fall times are unchanged.

| Sample | Acc | Fix | -Map- | -Map- | Mag | Clip | DAC |
| --- | --- | --- | --- | --- | --- | --- | --- |
| 0 | 0 | 0 | 0 | 0 | 0 | 0 | 0.00 |
| 1 | −90 | 10 | 0 | 10 | 33 | 33 | 0.33 |
| 2 | −80 | 20 | 0 | 20 | 67 | 67 | 0.67 |
| 3 | −70 | 30 | 0 | 30 | 100 | 100 | 1.00 |
| 4 | −60 | 40 | 0 | 40 | 133 | 100 | 1.00 |
| 5 | −50 | 50 | 1 | 0 | 0 | 0 | 1.00 |
| 6 | −40 | 60 | 1 | 10 | 33 | 33 | 0.67 |
| 7 | −30 | 70 | 1 | 20 | 67 | 67 | 0.33 |
| 8 | −20 | 80 | 1 | 30 | 100 | 100 | 0.00 |
| 9 | −10 | 90 | 1 | 40 | 133 | 100 | 0.00 |
| 10 | 0 | 0 | 0 | 0 | 0 | 0 | 0.00 |
| 11 | −90 | 10 | 0 | 10 | 33 | 33 | 0.33 |
| 12 | −80 | 20 | 0 | 20 | 67 | 67 | 0.67 |
| 13 | −70 | 30 | 0 | 30 | 100 | 100 | 1.00 |
| 14 | −60 | 40 | 0 | 40 | 133 | 100 | 1.00 |
| 15 | −50 | 50 | 1 | 0 | 0 | 0 | 1.00 |
| 16 | −40 | 60 | 1 | 10 | 33 | 33 | 0.67 |
| 17 | −30 | 70 | 1 | 20 | 67 | 67 | 0.33 |
| 18 | −20 | 80 | 1 | 30 | 100 | 100 | 0.00 |
| 19 | −10 | 90 | 1 | 40 | 133 | 100 | 0.00 |
| 20 | 0 | 0 | 0 | 0 | 0 | 0 | 0.00 |
| 21 | −90 | 10 | 0 | 10 | 33 | 33 | 0.33 |
| 22 | −80 | 20 | 0 | 20 | 67 | 67 | 0.67 |
| 23 | −70 | 30 | 0 | 30 | 100 | 100 | 1.00 |
| 24 | −60 | 40 | 0 | 40 | 133 | 100 | 1.00 |
| 25 | −50 | 50 | 1 | 0 | 0 | 0 | 1.00 |

As is apparent from the above table, changing the modulo results in changing the period of the pulse waveform without changing the edge rise and fall times.

In the final example the edge rise and fall times are changed to five samples to produce a saw tooth waveform by adjusting the scale factor in the magnifier. The period and duty cycle are unchanged.

| Sample | Acc | Fix | -Map- | -Map- | Mag | Clip | DAC |
| --- | --- | --- | --- | --- | --- | --- | --- |
| 0 | 0 | 0 | 0 | 0 | 0 | 0 | 0.00 |
| 1 | −90 | 10 | 0 | 10 | 20 | 20 | 0.20 |
| 2 | −80 | 20 | 0 | 20 | 40 | 40 | 0.40 |
| 3 | −70 | 30 | 0 | 30 | 60 | 60 | 0.60 |
| 4 | −60 | 40 | 0 | 40 | 80 | 80 | 0.80 |
| 5 | −50 | 50 | 1 | 0 | 0 | 0 | 1.00 |
| 6 | −40 | 60 | 1 | 10 | 20 | 20 | 0.80 |
| 7 | −30 | 70 | 1 | 20 | 40 | 40 | 0.60 |
| 8 | −20 | 80 | 1 | 30 | 60 | 60 | 0.40 |
| 9 | −10 | 90 | 1 | 40 | 80 | 80 | 0.20 |
| 10 | 0 | 0 | 0 | 0 | 0 | 0 | 0.00 |
| 11 | −90 | 10 | 0 | 10 | 20 | 20 | 0.20 |
| 12 | −80 | 20 | 0 | 20 | 40 | 40 | 0.40 |
| 13 | −70 | 30 | 0 | 30 | 60 | 60 | 0.60 |
| 14 | −60 | 40 | 0 | 40 | 80 | 80 | 0.80 |
| 15 | −50 | 50 | 1 | 0 | 0 | 0 | 1.00 |
| 16 | −40 | 60 | 1 | 10 | 20 | 20 | 0.80 |
| 17 | −30 | 70 | 1 | 20 | 40 | 40 | 0.60 |

-continued

| Sample | Acc | Fix | -Map- | -Map- | Mag | Clip | DAC |
|---|---|---|---|---|---|---|---|
| 18 | −20 | 80 | 1 | 30 | 60 | 60 | 0.40 |
| 19 | −10 | 90 | 1 | 40 | 80 | 80 | 0.20 |
| 20 | 0 | 0 | 0 | 0 | 0 | 0 | 0.00 |
| 21 | −90 | 10 | 0 | 10 | 20 | 20 | 0.20 |
| 22 | −80 | 20 | 0 | 20 | 40 | 40 | 0.40 |
| 23 | −70 | 30 | 0 | 30 | 60 | 60 | 0.60 |
| 24 | −60 | 40 | 0 | 40 | 80 | 80 | 0.80 |
| 25 | −50 | 50 | 1 | 0 | 0 | 0 | 1.00 |

Figure 10:
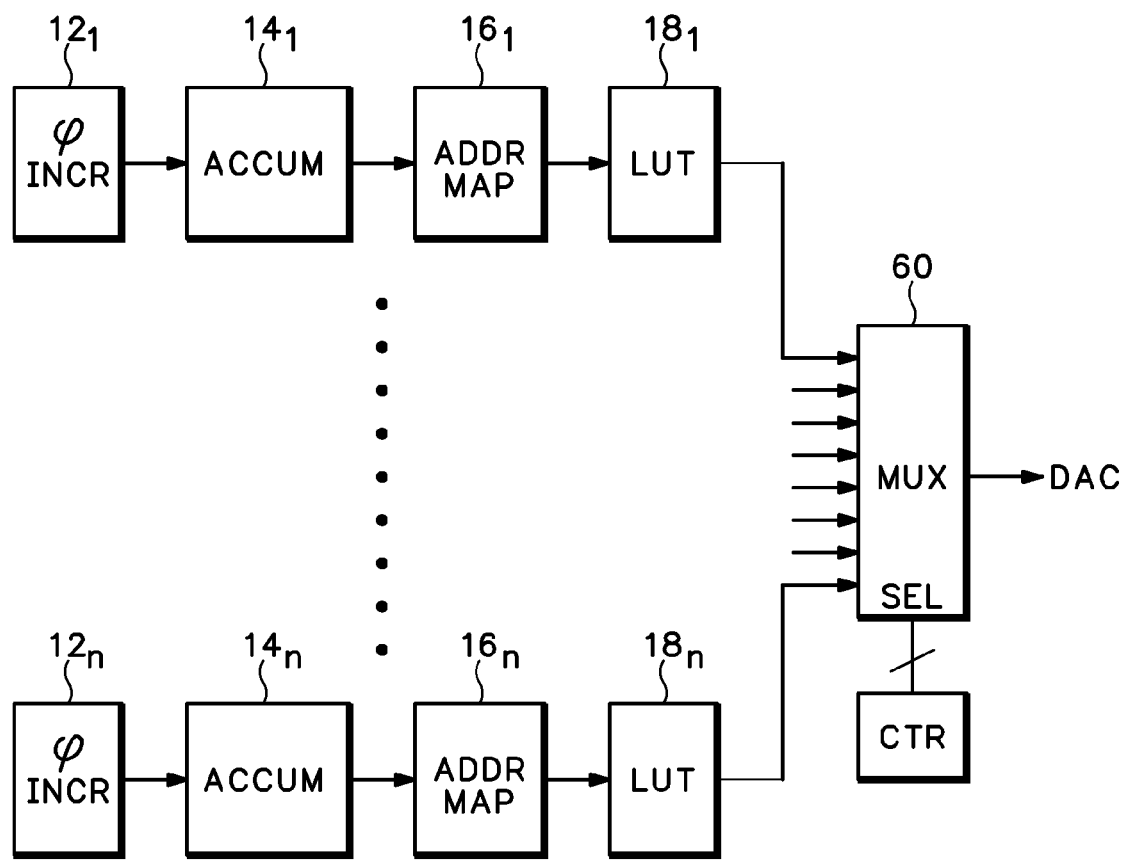
FIG. 10 is a block diagram view of a DDS pulse generator architecture using parallel DDS circuits according to the present invention.

Multiple DDS circuits, such as eight as shown in FIG. 10, may be operated in parallel in order to increase the sample rate of the digital data being sent to the DAC. When multiple DDS circuits are operated in parallel, each circuit is programmed to produce the same waveform. However when starting the circuits, the phase or time delay of each circuit is initially set to a slightly different value. To produce data with a one-degree phase shift between each data value, the first DDS circuit starts with an initial phase shift of zero. The next DDS circuit is started with an initial phase shift of one degree, etc., up to the $n^{th}$ DDS circuit which is started with an initial phase shift of (n−1) degrees. On the first cycle of operation n data values are produced in parallel. All of the phase increments are set to n degrees so that on the next cycle the n data values produced are for n through (2n−1) degrees in increments of one degree. The outputs from the DDS circuits are input to an output multiplexer 60 that provides the values to the DAC which is capable of operating at a very high frequency relative to the access times of the lookup tables 18.

Changing the frequency of the output signal is more difficult when there are multiple DDS circuits operating in parallel. With a single DDS circuit the frequency of the output signal is varied by changing the phase increment. The same is true with multiple DDS circuits. However with multiple DDS circuits the phase shift between each circuit needs to be properly set. With n DDS circuits the phase shift between circuits is one $n^{th}$ of the phase increment. There are multiple ways to compute the phase accumulator value when using multiple DDS circuits. One way is to have the first DDS circuit compute the phase accumulator value using the phase increment that produces the proper signal output frequency. The other phase accumulator values are computed by taking the first phase accumulator value and adding to it a fraction of the next phase increment value. When using n DDS circuits the fraction used are 1/n, 2/n, . . . , (n−1)/n. In another scheme there are n phase accumulators. Each is incremented by a portion of the current phase increment and a portion of the next phase increment. The phase increment for the $m^{th}$ phase accumulator is ((n−m)/n)*(current_increment)+(m/n)*(next_increment). When using this scheme it is important to not accumulate rounding or truncation errors by insuring that the arithmetic is performed with sufficient precision. For n=8 three fractional binary digits make the arithmetic precise.

Thus the present invention provides a DDS pulse generator architecture that uses a programmable modulo value for adjusting the period of a pulse signal without changing the positions of the edges and an address mapping circuit that maps specific ranges of phase accumulator values into lookup tables, or different regions of a single lookup table, to define the rising and falling edges even when the period is very long compared to the edge rise and fall times.

What is claimed is:

1. A Direct Digital Synthesis (DDS) pulse generator architecture of the type having an accumulator and a waveform lookup table further comprising:
   means for changing a period of a pulse output signal using a programmable modulo value without changing the positions of edges of the pulse output signal; and
   means for mapping specific ranges of accumulator values into portions of the lookup table that define rising and falling edges of the pulse output signal.

2. The DDS pulse generator architecture as recited in claim 1 wherein the changing means comprises means for subtracting the programmable modulo value from the accumulator values when the accumulator values exceed the programmable modulo value.

3. The DDS pulse generator architecture as recited in claim 2 wherein the subtracting means comprises:
   means for multiplexing a phase increment value with a value equal to the phase increment value minus the predetermined modulo; and
   means coupled to the output of the accumulator for providing a select signal to the multiplexing means to select the phase increment value for cycles when the accumulator values are less than the predetermined modulo and to select the value equal to the phase increment value minus the predetermined modulo when the accumulator values exceed or are equal to the predetermined modulo.

4. The DDS pulse generator architecture as recited in claim 3 wherein the changing means further comprises means for converting the accumulator values to a range of values for input to the mapping means.

5. The DDS pulse generator architecture as recited in claim 1 wherein the mapping means comprises:
   means for mapping the rising and falling edges into the portions of the lookup table that define rising and falling edges of the pulse output signal to provide initial address values;
   means for magnifying the initial address values to produce output address values that define rising and falling edge rates; and
   means for clipping the output address values to an address range for the lookup table.

6. The DDS pulse generator architecture as recited in claim 5 wherein the mapping means comprises:
   means for comparing the accumulator values with a rising edge start value and with a falling edge start value;
   means for selecting the accumulator values when the accumulator values exceed or equal the rising edge start value as the initial address values; and
   means for selecting the accumulator values when the accumulator values exceed or equal the falling edge start value as the initial address values.

7. The DDS pulse generator architecture as recited in claim 5 wherein the magnifying means comprises a multiplier having as inputs the initial address values and a scaling factor to produce the output address values.

8. The DDS pulse generator architecture as recited in claim 5 wherein the magnifying means comprises a shift register having as input the initial address values and a shift amount to produce the output address values.

9. The DDS pulse generator architecture as recited in claim 5 wherein the magnifying means comprises means for adaptively multiplying the initial address values according to whether the initial address values represent the rising edge or the falling edge.

10. The DDS pulse generator architecture as recited in claim 9 wherein the adaptive multiplying means comprises a first multiplier having as inputs the initial address values representing the rising edge and a first scaling factor and a second multiplier having as inputs the initial address values representing the falling edge and a second scaling factor to provide the output address values.

11. A DDS pulse generator architecture having a plurality of phase accumulators with corresponding waveform lookup tables wherein each phase accumulator comprises:

means for changing a period of a pulse output signal using a programmable modulo value without changing the positions of edges of the pulse output signal;

means for mapping specific ranges of accumulator values into the corresponding waveform lookup table that defines rising and falling edges of the pulse output signals;

means for offsetting one phase accumulator from the next; and means for combining phase accumulation values from the phase accumulators to generate a single phase accumulator value as an output for each cycle of the phase accumulators.

\* \* \* \* \*